United States Patent
Legrand

(10) Patent No.: US 6,838,179 B1
(45) Date of Patent: Jan. 4, 2005

(54) PYROLYTIC LAYER OF ALUMINIUM OXYNITRIDE AND GLAZING COMPRISING SAME

(75) Inventor: Philippe Legrand, Mons (BE)

(73) Assignee: Glaverbel, Brussels (BE)

( * ) Notice: Subject to any disclaimer, the term of this patent is extended or adjusted under 35 U.S.C. 154(b) by 0 days.

(21) Appl. No.: 10/031,237

(22) PCT Filed: Jun. 19, 2000

(86) PCT No.: PCT/EP00/05615

§ 371 (c)(1),
(2), (4) Date: Feb. 1, 2002

(87) PCT Pub. No.: WO01/05723

PCT Pub. Date: Jan. 25, 2001

(30) Foreign Application Priority Data

Jul. 20, 1999  (LU) .................................................. 90420

(51) Int. Cl.$^7$ ........................... B32B 17/06; B32B 9/04; C23C 16/30
(52) U.S. Cl. ....................... 428/432; 428/698; 428/701; 428/704; 106/287.17; 106/287.3; 427/255.11; 427/255.394
(58) Field of Search ................................. 428/426, 432, 428/688, 689, 698, 701, 704; 501/40, 41, 96.1, 96.2, 98.4, 153; 106/286.8, 287.17, 287.3; 427/255.11, 255.394

(56) References Cited

U.S. PATENT DOCUMENTS

| | | | | |
|---|---|---|---|---|
| 5,075,265 A | * | 12/1991 | Narula | ........................ 501/96.1 |
| 5,993,950 A | * | 11/1999 | Novis et al. | ................. 428/216 |
| 6,416,890 B1 | * | 7/2002 | Terneu et al. | ................ 428/701 |
| 6,498,380 B1 | * | 12/2002 | Otani et al. | .................. 257/432 |

* cited by examiner

*Primary Examiner*—Deborah Jones
*Assistant Examiner*—G. Blackwell-Rudasill
(74) *Attorney, Agent, or Firm*—Piper Rudnick LLP; Jerold I. Schneider

(57) ABSTRACT

The invention concerns glass panels comprising thin layers in particular for providing them with solar protective or low-emissive properties, and also comprising other thin layers for correcting rainbow effects induced by the former. The invention is characterized in that said glass panels comprise a glass substrate coated with an aluminum oxynitride layer, deposited by gas phase pyrolysis, and whereof the characteristics of thickness and refractive index are selected so as to attenuate colors reflected by the layer providing the glass panel with low-emissive and/or solar protective properties, layer which is deposited on the aluminum oxynitride layer.

9 Claims, No Drawings

PYROLYTIC LAYER OF ALUMINIUM OXYNITRIDE AND GLAZING COMPRISING SAME

CROSS REFERENCE TO RELATED APPLICATIONS

This application is the U.S. national stage of International Application No. PCT/EP00/05615 filed 19 Jun. 2000, and Luxembourg Application No. 90420 filed 20 Jul. 1999. The entirety of each of those applications is incorporated herein by reference.

BACKGROUND OF THE INVENTION

The invention relates to thin layers deposited on a transparent glass substrate to modify their optical characteristics. In particular, the invention concerns thin layers interposed between the glass substrate and another thin functional layer, in particular a solar protection or low-emission layer.

It is well known that the presence of a low-emission or solar protection layer, in particular those with the most suitable thicknesses and refractive indexes, both with respect to efficiency and to industrial application, causes parasitic colorations, in particular in reflected light. These colorations which occur in the form of areas of iridescence must be fully suppressed for conventional uses, and most particularly for clear glasses where their presence is most detrimental to the appearance of those glazing units comprising such glasses.

In order to prevent these phenomena, it is well known to interpose a "sub-layer", the refractive index and thickness of which are selected to attenuate or practically eliminate these areas of iridescence, between the functional layer and the glass substrate. Theory allows the appropriate values for these parameters to be determined precisely. However, in practice some difficulties are encountered in the implementation because of the many technical requirements which industrial production must meet to produce these sub-layers in an efficient and economical manner.

While various solutions have been proposed for the production of these sub-layers, the most widely used is that of silicon-based sub-layers. The most advantageous methods of deposition from the point of view of expense for the formation of these sub-layers are based on pyrolysis, and most particularly gas-phase pyrolysis (CVD). In these methods the deposition of silicon working from gaseous precursors such as silanes is generally conducted directly on the glass ribbon continuously while this is being produced. The temperature conditions of the glass enable the reaction of pyrolysis of the precursors which are brought into contact with this. However, the choice of proceeding in these conditions implies that there are set requirements associated with the special features of the assembly into which the deposition operation has just been integrated.

The deposition of sub-layers in the conditions which have just been outlined must be conducted quickly. The ribbon of glass to be coated passes under ducts which bring the precursors into contact with it. The contact time of the gas and glass, irrespective of the arrangements of the plant, is necessarily limited. Therefore, highly reactive precursors must be used to achieve the thickness of deposition during this very short period. The precursors of silicon layers have a very high reactivity in temperature conditions such as those of the ribbon of glass exiting from the molten tin bath.

However, previous methods of forming silicon-based sub-layers have some disadvantages. In particular, the precursors of silicon cause rapid fouling of the plant.

The deposition ducts are disposed in direct proximity to the ribbon of glass to ensure good contact and thus a favourable output from the reaction. The distance separating the ribbon of glass from the duct or ducts is generally only a few mm. In these conditions, parasitic deposits of reagents on the structures in the vicinity of the duct rapidly reach dimensions which necessitate cleaning, otherwise the presence of parasitic deposits causes disruptions in the flows of gas, which lead to irregularities in the layer. If fouling continues for long the glass may even rub against the concretions formed which leads to unacceptable marks and scratches. In the present state, cleaning constitutes an interruption in production at regular intervals, and this is even more detrimental to the good function of the operation since these cleaning operations are very frequent.

Moreover, the sub-layer must have well controlled properties, in particular the refractive index, in order to take into account the special features of the layers from which they eliminate the disadvantages described above. The precise characteristics of the silicon-based layers are difficult to control. Various proposals have been made to achieve a well defined refractive index without having come to a perfectly satisfactory method.

SUMMARY OF THE INVENTION

For the reasons indicated above, it is desirable to be able to have new sub-layers which better meet practical needs. It is the aim of the invention to provide such sub-layers. In particular the invention proposes to provide sub-layers, whose production can be well controlled, even when using CVD, without this control being prejudicial to the speed of the reaction.

The invention proposes to dispose as sub-layer on a glass substrate a transparent layer based on aluminium oxynitride deposited by a gas-phase pyrolysis technique. The designation aluminium oxynitride refers to the product based on aluminium, nitrogen and oxygen in variable proportions which are specified precisely below. The analysis of layers using a scanning electron microscope (SEM) does not reveal any fault in the regularity at resolutions of less than a tenth of a micron. For the envisaged applications, the layer is thus presented as a part of a perfectly homogeneous composition, irrespective of its atomic formula of the type $AlN_xO_y$, wherein x and y can vary appreciably as indicated further below.

The use of thin layers based on aluminium nitrides has been the subject of numerous publications. The object of the main applications of this type of layers is to improve the wear resistance properties of the substrate on which they are deposited. These layers are relatively thick and do not have any particular optical characteristics.

Other layers based on aluminium nitrides have been proposed to be applied to glazing units to provide protection to an underlying functional, mainly reflective, layer. For example, it is a matter of protecting a layer based on TiN or Ag from oxidation.

It is also proposed, in the case of a vacuum deposition technique, to use a layer, in particular based on aluminium nitride, on the glass substrate in order to protect a titanium nitride layer subsequently deposited. In this case the layer has a very reduced thickness, a few nanometers at maximum (EP-A 536607).

Previous literature reports on the use of assemblies of reflective layers, particularly metal layers, joined to absorbent layers of various types, of aluminium nitride, the whole being vacuum deposited to form glazing units with solar protection properties.

Aluminium oxide layers are known for their properties of mechanical hardness and their chemical inertia. Studies have also been conducted to form thin layers by gas-phase pyrolysis for which the refractive index has been determined (Journal of Electronic Material Vol. 17, No. 6, pp. 509–517). The refractive indexes of the layers obtained range from 1.62 to 1.63. These indexes are less than those which are preferred to produce the attenuation sought according to the invention at least when a single sub-layer is used. The literature also proposes forming assemblies comprising at least two sub-layers with graduated indexes to prevent areas of iridescence. Moreover, previous aluminium oxide layers have been produced in very specific conditions in the laboratory. The reactions for forming these layers using trimethyl aluminium (TMA) are very difficult to control. Even in the laboratory, the reaction develops very significantly in the gas phase and the resulting aluminium powder must be subject to specific measures to prevent it from being deposited on the glass plate serving as substrate in the form of a mass foreign to the layer. If one adds that the speed of the formation of the layer remains relatively low, irrespective of the precautions taken (at best some nanometers per second), it is found that such layers far from satisfy the requirements outlined above.

The invention proposes to use layers based on aluminium oxynitride produced by gas-phase pyrolysis on a glass substrate so as to attenuate the reflected colours produced by an oxide layer providing the glazing with low-emission and/or solar protection properties, said layer being deposited onto the aluminium oxynitride layer.

The aluminium oxynitride layers used according to the invention have variable compositions which are dependent on the conditions of application. Advantageously, in particular to obtain the most satisfactory refractive indexes, the atomic proportions of the constituents of these layers are as follows:

| | |
|---|---|
| Al | from 40 to 50% |
| N | from 20 to 50% |
| O | from 10 to 60%. |

Particularly preferred, the composition of the layers according to the invention is:

| | |
|---|---|
| Al | from 45 to 50% |
| N | from 22 to 30% |
| O | from 20 to 27%. |

The aluminium oxynitride layers according to the invention have a variable refractive index depending on their composition and the conditions under which they were obtained. This is between 1.6 and 1.8. For the envisaged used, i.e. as sub-layer of a low-emission and/or solar protection layer, the layer must have an intermediate index between that of the substrate and that of the layer superposed on it. Preferably, the refractive index of the aluminium oxynitride layer is in the range of between 1.65 and 1.75, particularly when the low-emission or solar protection layer is a tin oxide-based layer.

In order to obtain the anti-iridescence effect, the layers according to the invention must have a thickness which depends partly on its refractive index and that of the substrate and of the low-emission or solar protection layer. As a function of this refractive index, the thickness of the layers is advantageously in the range of between 50 and 90 nanometers, and preferably between 65 and 85 nanometers. The layers according to the invention can contain elements other than Al, N and O in small proportions. These elements are normally impurities introduced with the precursors or residues of pyrolysis reactions, or may also come from the substrate itself.

In the production of the layers, when aluminium trichloride is used as precursor, a possible residual element is chlorine. The presence of chlorine in the layer is not desirable. The residual content of chlorine in the layers according to the invention is as low as possible and advantageously remains less than 4%.

The layer according to the invention may also contain alkaline elements, in particular sodium coming from the substrate via diffusion. Experience has shown that the sodium contents remain very low and normally are less than 1%. As we shall explain further below, this low content results in resistant layers in the traditional tests conducted on this type of layers.

The layers according to the invention are deposited by gas-phase pyrolysis. Advantageously, this is conducted directly on the ribbon of glass inside the "float" bath, or immediately on exiting from this. In these conditions the operation is conducted continuously.

The choice of operating directly on the production line largely determines the temperature conditions of the pyrolysis. In practice, the temperature is normally in the range of between 600 and 730° C. at the locations indicated.

The precursors used must meet a range of requirements. They must be able to react satisfactorily in the working conditions. Their reactivity must be sufficient to be able to produce relatively thick layers in a very short time. However, this must not be such that it leads to unwanted parasitic reactions such as reactions in the gas phase before contact with the glass. The precursors must also be capable of being easily put into gaseous form to be transported to the substrate in conditions easily achieved industrially. For liquid or solid compositions at ordinary temperature it is important that vaporisation is sufficient at a temperature which is not too high to permit transport to the pyrolysis ducts without the risk of condensation in the duct systems.

Other requirements also apply to the precursors. It goes without saying that these products must be as inexpensive as possible, even if they are used in very low quantities. They must not have a toxicity which renders them unusable in the industrial domain in the usual envisaged processing conditions.

Taking these requirements into account, the inventors have shown that it is advantageous to use aluminium trichloride. Trimethyl aluminium (TMA) which is a potential precursor favourably meets the reactivity requirements. It has the disadvantage of high flammability. Therefore, its use requires more restrictive measures to be taken.

Reference is made below to aluminium trichloride, but this does not exclude use according to the invention of other precursors of aluminium, in particular TMA.

Aluminium trichloride is sufficiently volatile when the temperature exceeds 150° C. It is sensitive to water and must therefore be placed or prepared in an essentially anhydrous medium. In practice, it is advantageous according to the invention to proceed with production of aluminium trichloride at the time of its use. This is achieved in a chlorinator-type arrangement.

The formation of nitride also includes the use of a nitrogenous reagent. With aluminium chloride the inventors advantageously use ammonia, nitrogen fluoride $NF_3$, or amines. The amines which are usable for the production of layers according to the invention preferably include amines with a relatively low molecular mass such as methylamine, ethylamine, propylamine and dimethylamine. The choice of one or other of the nitride precursors allows the reactivity to be adjusted, in particular as a function of the pyrolysis temperature.

The precursors are mixed with a carrier gas which is inert with respect to the precursors in the conditions of the reaction. Advantageously, this carrier gas is nitrogen.

When aluminium trichloride is used as precursor, the presence of water has an influence on the composition and optical characteristics of the layer. The water content is one of the factors which determine the proportions of oxygen and nitrogen in the formed layer, and as a result the refractive index of the layer. It is therefore possible to adjust the nature and characteristics by way of the water content.

The sub-layers of aluminium oxynitride are advantageously used in glazing units in which the low-emission or solar protection layer is an oxide layer of tin oxide, indium oxide, etc. According to practice in this field, these oxides are also advantageously doped. Tin oxide may thus be doped with fluorine and indium oxide maybe doped with tin. Similarly, it may also be a layer of tin containing antimony in accordance with the instruction of publications BE-A1010321 and 1010322.

For the glazing units comprising a layer of tin containing antimony, the atomic proportion of Sb/Sn is advantageously in the range of between 0.02 and 0.15, and preferably between 0.05 and 0.12%.

Advantageously, the functional layer is likewise deposited by a gas-phase pyrolysis method. In this case, it is preferred that the deposition of the sub-layer is followed immediately by that of the functional layer. When the sub-layer is produced inside the float bath, the deposition of the layer can follow immediately, either in the float or upon exit therefrom. The temperature and ambient conditions permit these two combinations.

DETAILED DESCRIPTION

The invention is described in detail in the following practical examples.

In all the examples given, the precursor of aluminium is aluminium trichloride. It is vaporised by sublimation at 150° C. (145° C. for example 2), and entrained in a flow of nitrogen at this same temperature. The chlorine content in the nitrogen is fixed at it and the flow rate of nitrogen is 5 standard liters per minute.

Some ammonia is also mixed with nitrogen as carrier gas. The proportion of ammonia used is much higher than that theoretically necessary to react with chlorine. In the following example, with the exception of example 3, the flow rate of ammonia is regulated in the pilot plant to 0.5 of a standard liter (SL) per minute. The flow rate of carrier nitrogen is 20 standard liters per minute, except also for example 3. For the latter, the respective flow rates are 15 SL of nitrogen and 5 SL of ammonia.

The water content is extremely low. In examples 1 to 8, it is equivalent to a flow rate of 0.02 SL per minute and 0.13 SL for example 9.

In all the examples the contact time of the gas with the hot glass is 5 seconds.

The following table shows the following for each test:
the temperature of the glass;
the average index $n_R$ measured by reflectometer;
the thickness $e_R$ determined by reflectometer;
the index $n_e$ determined by ellipsometer for the wavelength 550 nm;
the thickness $e_e$ determined by ellipsometer;
the atomic percentages of constituents of the layers.

| N° | t C.° | $n_R$ | $e_R$ (nm) | $n_e$ 550 nm | $e_e$ (nm) | Al (at %) | N (at %) | O (at %) |
|----|-------|-------|------------|--------------|------------|-----------|----------|----------|
| 1  | 700   | 1.69  | 75         | 1.71         | 79.7       | 47        | 23       | 25       |
| 2  | 700   | 1.71  | 75         | —            | —          | —         | —        | —        |
| 3  | 700   | 1.69  | 115        | 1.66         | 129.4      |           |          |          |
| 4  | 730   | 1.76  | 75         | 1.76         | 76.8       | 48        | 28       | 18       |
| 5  | 680   | 1.68  | 67         | 1.69         | 68.1       | 46        | 22       | 30       |
| 6  | 650   | 1.67  | 67         | —            | —          | 46        | 17       | 35       |
| 7  | 600   | —     | —          | —            | —          | —         | —        | —        |
| 8  | 700   | 1.71  | 88         | 1.71         | 80.5       | 48        | 26       | 22       |
| 9  | 700   | —     | 14         | —            | —          | 47        | 17       | 32       |

It must firstly be noted that the layer produced on the glass at 600° C. does not allow adequate determination of its characteristics. For the envisaged production, this temperature value constitutes, in the test conditions, the limit below which it is not possible to have an acceptable layer. The layer is too cloudy, taking into account the required transparency.

Looking at the different temperature used, it is found that irrespective of the method used, the index increases with the pyrolysis temperature. In the reflectometer it passes from 1.67 at 650° C. to 1.76 at 730° C.; or in the ellipsometer from 1.44 to 1.76 for the same temperatures. The reasons for this development are not completely clear. However, it is found that these differences also follow the differences in the proportions of the constituent elements, which would indicate that the reactive mechanisms are displaced by the increase in temperature.

The analyses, the results of which also appear in the table, show that the nitrogen content of the layer increases with the temperature.

Conversely, if the water content is increased, as in example 9, this benefits the presence of oxygen in the layer and the index tends to decrease.

The structure of the layer is not made perfectly clear. The diffraction X shows the presence of a structure with the crystalline appearance of AlN. The microscopic study of the layers, as indicated above, does not reveal any defect in homogeneity at the resolutions used. Irrespective, what is important for implementation of the invention is to have a means of regulating the index of the sub-layer by way of the temperature.

It is also found that the rate, of deposition increases with the temperature passing through a maximum at a temperature in the order of 700° C. Overall, with the exception of examples 7 and 9, the rate of deposition is at a satisfactory magnitude to be able to produce layers with the index and thickness suitable for attenuation of areas of iridescence.

The influence of the concentration of ammonia is approached in example 3. In this example, the very significant excess of this precursor in relation to that of aluminium principally leads to an appreciable increase in the rate of deposition. The overall nature of the layer does not appear to be modified, and the refractive index is practically unchanged in relation to that of the deposition serving as reference conducted at the same temperature with the proportions of precursors.

Glazing units according to the invention comprising a sub-layer of aluminium oxynitride and a solar protection layer have also been produced. In these tests, the functional layer is a layer of tin containing antimony. These layers are of the type of those described in the above-mentioned Belgian patent publications.

A first series of tests compares the solar protection layers formed directly on the glass and those formed on the sub-layer of aluminium oxynitride. In these tests, the sub-layer is deposited at 700° C. in the conditions of example 8 above. The deposition of the layer of tin doped with antimony is conducted immediately after formation of the sub-layer at a temperature of 600° C. by means of precursors $SnCl_4$ and $SbCl_5$. The reaction is conducted in the presence of water vapour.

To obtain perfectly identical conditions for deposition of the layer of tin containing antimony, half the glass is masked during deposition of the sub-layer and all the glass is exposed during formation of the layer.

Surprisingly, it is found that the two parts of these layers of tin containing antimony are not identical. The part of the layer deposited on the sub-layer is thicker than that formed directly on the glass. In other words, the presence of the sub-layer seems to facilitate the deposition of the tin layer. This improvement is in the order of 10%. For information purposes, a simultaneous deposition on a glass sheet partly coated with a sub-layer of aluminium oxynitride results in respective thicknesses of 250 and 286 nanometers. Other than the variation in thickness, the properties of the two layers of tin containing antimony are identical. In particular, the presence of the sub-layer does not lead to the formation of cloudiness and attenuates areas of iridescence which show on the part which only contains the tin oxide containing antimony.

In a second series of tests, different sub-layers have been produced on which a layer of tin oxide and antimony is applied, again by gas-phase pyrolysis. The tin oxide and antimony layer is systematically 350 nanometers thick. The thicknesses and indexes of the sub-layers are indicated, as well as the calorimetric indexes in reflected light according to the CIE for each glazing formed. The results are given in the following table:

|    | $n_e$ | $e_e$ (nm) | a     | b     |
|----|-------|------------|-------|-------|
| 10 | 1.71  | 75         | −3.93 | −0.93 |
| 11 | 1.70  | 80         | −2.33 | 2.33  |
| 12 | 1.72  | 75         | 1.28  | 1.64  |
| 13 | 1.71  | 73         | −7.78 | 3.85  |

The results show that the attenuation of parasitic reflections by means of the sub-layer of aluminium oxynitride is comfortably assured by choosing the thickness and index of the sub-layer by way of the deposition temperature, but also by modifying the proportions of the precursor reagents. A value which is mutually regarded as acceptable for attenuation meets the condition $(a^2+b^2)^{1/2}<10$. This condition is met for each of the examples indicated in the table. However, it is noted that this condition, and therefore the attenuation, are very sensitive to the characteristics of the layer.

Moreover, the favourable corrosion behaviour and abrasion behaviour of the glazing units according to the invention have been confirmed as well as their favourable behaviour in the cambering and quenching treatments.

Thanks to the invention, we have a satisfactory alternative to previous methods for the production of low-emission/solar protection glazing units which do not exhibit the undesirable phenomena of iridescence in reflected light. It is possible to precisely control the characteristics of the sub-layers, and most especially their index, in particular by the choice of pyrolysis temperature of the precursors of this sub-layer.

Finally, the use of layers according to the invention is not impaired by the fouling known in previous methods. Therefore, we have particularly advantageous means, from the industrial point of view, for the production of the glazing units in question.

What is claimed is:

1. Glazing comprising a glass substrate coated with a layer of aluminum oxynitride deposited by gas-phase pyrolysis, wherein the constituent elements of the aluminum oxynitride layer are respectively in the following atomic proportions:
Al from 40 to 50%
N from 20 to 50%
O from 10 to 60%;
the thickness and refractive index characteristics thereof being selected so as to attenuate the reflected colors produced by an oxide layer providing the glazing with low-emission and/or solar protection properties, said layer being deposited onto the aluminum oxynitride layer.

2. Glazing according to claim 1, and including at least one of the following features (A) through (C):
(A) wherein the reflective index of the aluminum oxynitride layer is in the range of between 1.6 and 1.8;
(B) wherein the thickness of the aluminum oxynitride layer is in the range of between 500 and 900 ångströms; and
(C) wherein the oxide layer providing the low-emission and/or solar protection properties is a layer based on doped tin oxide.

3. Glazing according to claim 2 and including at least two of the features (A) through C.

4. Glazing according to claim 2 and including all of the features (A) through (C).

5. Glazing according to claim 4 wherein:
the constituent elements of the aluminum oxynitride layer are respectively in the following atomic proportions:

| Al | from 45 to 50% |
| N  | from 22 to 30% |
| O  | from 20 to 27%; | the refractive index of the aluminum oxynitride layer is in the range of between 1.65 and 1.75; and
the aluminum oxynitride layer has a thickness in the range of between 650 and 850 ångströms.

6. Glazing according to claim 1 wherein the oxide layer providing the low-emission and/or solar protection properties is a layer based on at least one of the following D through F:
D doped tin oxide;
E is a tin oxide layer containing antimony oxide, the atomic ratio Sb/Sn being in the range of between 0.02 and 0.15;
F fluorine-doped tin oxide.

7. Process for the production of glazing according to claim 1, wherein the aluminum oxynitride layer is formed by pyrolysis using gaseous precursors comprising aluminum trichloride or trimethyl aluminum.

8. Process for the production of glazing according to claim 7, wherein the gaseous precursors also comprise ammonia.

9. Process for the production of glazing according to claim 7, wherein the aluminum precursor is aluminum trichloride, the precursors also contain water vapour.

* * * * *